United States Patent [19]

Spearman

[11] Patent Number: 4,659,467
[45] Date of Patent: Apr. 21, 1987

[54] SPIN CONNECTION ADSORPTION FILTER

[76] Inventor: Michael R. Spearman, 1030 W. Larpenteur Ave., St. Paul, Minn. 55113

[21] Appl. No.: 754,998

[22] Filed: Jul. 15, 1985

[51] Int. Cl.⁴ .................... B01D 15/00; B01D 53/04
[52] U.S. Cl. .................................. 210/282; 55/387; 55/389; 210/288
[58] Field of Search .................. 210/282, 288, 440; 55/387, 389

[56] References Cited

U.S. PATENT DOCUMENTS 3,554,377 1/1971 Miller .................................. 210/288

Primary Examiner—Ivars Cintins
Attorney, Agent, or Firm—Jacobson and Johnson

[57] ABSTRACT

An adsorption filter is provided by a tank which contains an adsorbent material that is capable of removing impurities from a fluid stream. Filtering may be done by the mass transfer zone principle of adsorption. The tank is formed with an elongated outer shell which is closed at one end and open at the other. An elongated core with an open upper end and a fluid opening at its lower end is centered in the open shell by a funnel that has a centrally located rod and a conical outer wall that contacts the top of the shell adjacent its open end which allows adsorbent material to be poured into the space between the shell and the core. The length of the shell is preferably at least two times as long as the mass transfer zone of the adsorbent material while the fluid opening at the lower end of the core is preferably on the order of three fourths as long as the mass transfer zone. A cap that has a port in fluid communication with the space between the shell and the core is formed by a ring of screened apertures. The second port is formed through the cap which is aligned with the open upper end of the core. The cap otherwise closes off the open end of the shell after the tank is filled with adsorbent and the funnel is removed. The cap is provided with female threads that allow the tank to be screwed into the outlet pipe in a receptacle in a self-supporting manner which allows contaminated fluid to flow into the tank through one of the ports and out the other of the ports.

1 Claim, 4 Drawing Figures

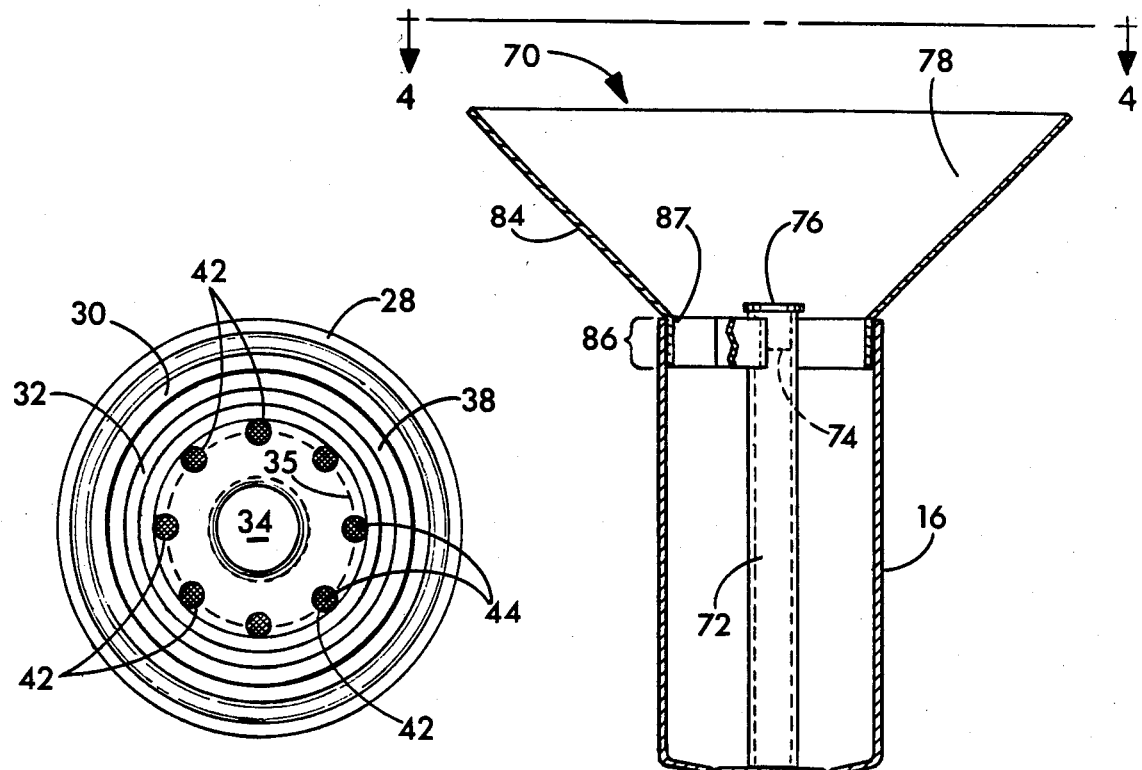
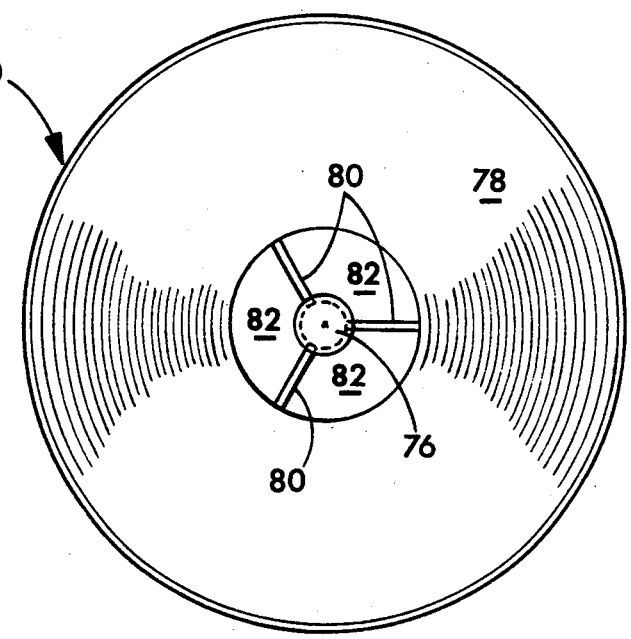

SPIN CONNECTION ADSORPTION FILTER

BACKGROUND OF THE INVENTION

The process of dynamic adsorption, for removing an impurity or adsorbate from a liquid or gas stream, is achieved by directing the fluid stream through a column of a suitable adsorbent. The adsorbent may be molecular sieves, activated aluminum, silica gels, fuller's earth, activated carbon or other materials known, or found, to be useful for the intended purpose.

Commonly the adsorbent is contained in an elongated tank and the fluid stream passes through the material from one end of the tank to the other end. The majority of the impurity removal occurs in a limited zone, which is called a mass transfer zone (MTZ). The MTZ will be of a definite length for each intended application. The beginning of the zone is defined as the point where the fluid has a 95% concentration of the inlet adsorbate concentration. The end of the zone is the point where the fluid stream has a 5% concentratoin of the inlet adsorbate concentration. The adsorbate may be any undesired contaminate, including organic materials, acids, caustic materials, alcohols, aromatics, water and other undesired substances.

The column of adsorbent and dynamic adsorption tanks is generally of a length which is a multiple (preferably at least three) of the length of the MTZ for the intended application. This enables the MTZ to move along the column as more and more of the adsorbent at the inlet becomes "spent" or reaches equilibrium with the incoming fluid. The zone of "spent" adsorbent, therefore, increases with time while the zone below the MTZ, where the adsorbent is only slightly contaminated, and is essentially in equilibrium with the exit fluid, shrinks with time. By providing a column length that is several times as long as the MTZ, a longer operating time is obtained for the filter before replacement or regeneration is required.

For a given mass flow rate, temperature, pressure and adsorbate concentration, it is known that tall, thin columns have higher dynamic adsorption capacities than short, thick ones. This means that more efficient dynamic adsorption is obtained by using high velocity, long adsorbent paths.

The tanks used for filters that employ the MTZ principle have separate inlet and outlet connections at opposite ends of the filter tank which require threaded elements which may be relatively expensive and inconvenient to connect. Other tanks are permanently mounted to the system and the adsorbent must be periodically drained and replaced. In addition, additional support structure must be provided to support these tanks.

Oil filters made for automotive applications are commonly constructed with a centrally located output port that is threaded for spin-connection to an output pipe and an outer ring of input port aptitude which receive the contaminated oil. This type of filter has achieved great acceptance because of the ease with which it may be replaced, its relatively large filtering capacity for its size and because it is self-supporting when it is screwed into place. The flow pattern of the conventional oil filter, however, is from the inlet port through a small portion of the filter media, which differs for different parts of the fluid stream, and out a multitude of small holes that are provided along substantially the entire length of the inner core which leads to the outlet port. While this type of fluid flow is suitable for particulate oil filtration, it does not provide for the optimum purification of fluids that can be obtained with a given amount of adsorbent material, in accordance with the present invention. For example, filtration accomplished by the present invention is especially well suited for the purification of fluids employed in semiconductor manufacture, where the fluid purification process may be selected for particular types of impurities and the concentration of these impurities in the exit fluid must be exceedingly small, especially where vacuum pump systems are involved. It is also useful for removing impurities from compressed gas or air streams.

SUMMARY OF THE INVENTION

The present invention is directed to a filter that includes an adsorbent-containing tank and a method of constructing the filter. The filter is suited for adsorption of impurities from a fluid stream that flows through the tank. The adsorption is preferably by the mass transfer principle. The tank is constructed with an elongated shell and when the adsorption occurs in a mass transfer zone the tank is several times as long as the mass transfer zone for the intended application in order to provide a long, relatively thin adsorbent path for contaminated fluid flowing through the shell. Fluid flows between the core and the shell only through a fluid opening provided by apertures in the lower end of the core which extend along a length of the core which is preferably shorter than the mass transfer zone for the intended application. The first port is in fluid communication with the core. The second port is provided with threads that allow the tank to be screwed to a receptacle in a self-supporting manner so that fluid may flow in one of these ports and out the other. The space between the shell of the tank and the outer surface of the core is filled with adsorbent material which may be particulate material, that is poured into the tank through a specially constructed funnel that blocks adsorbent material from going into the central core but allows it to fill up the space between the shell and the core. The core may be centered and held into place by the adsorbent material as the tank is filled. After the tank is filled the funnel is removed and a cap which provides the two ports is secured over the shell to complete the construction of the tanks.

DESCRIPTION OF THE DRAWINGS

The present invention is described by reference to the drawings in which

FIG. 2 is a top view of the filter of FIG. 1;

FIG. 3 is a side view which is partially cut away to show the method of constructing and filling the filter; and FIG. 4 is a top view of FIG. 3.

DESCRIPTION OF THE INVENTION

Figure 1:
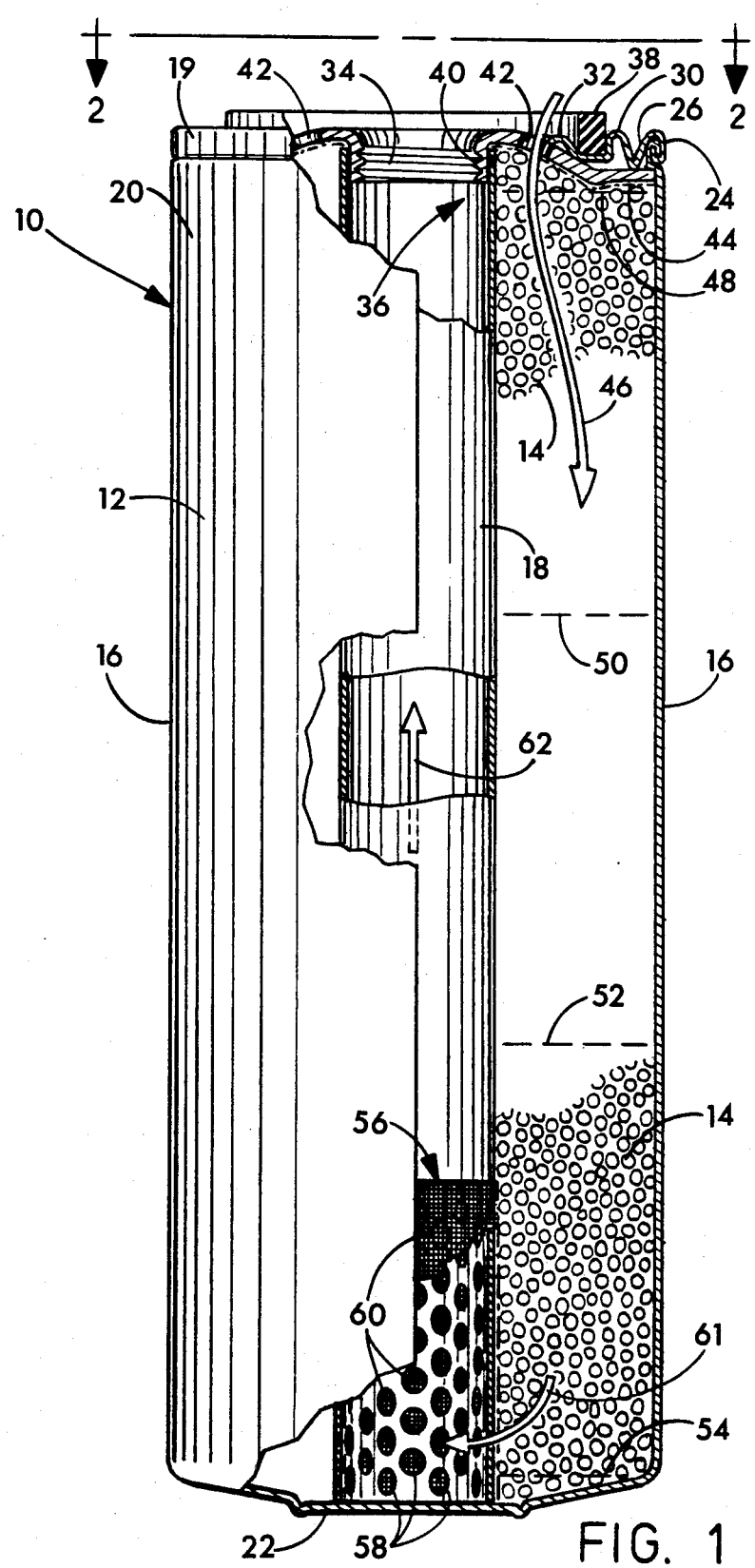
FIG. 1 is a side partially cut-away view of the filter of the present invention.

The present invention is described by reference to the drawings in which FIG. 1 shows the filter 10 which consists of a tank 12 that contains adsorbent materials, such as the particulate material 14, which is contained in the space between the shell 16 and the cylindrical core 18. The adsorbent material may be any type of suitable material including molecular sieves, silica gel and the like as previously noted. The adsorbent material preferably removes adsorbates from a fluid stream by the mass transfer principle. The tank 12 is completed by a cap 19 which seals off the upper open end 20 of the cylindrical shell 16, which has a radius that is approximately four times the radius of the core. The lower end 22 of the shell 16 is closed. The cap 19 has a downwardly extending lip 24 around its outer periphery which is crimped to an upwardly extending rim 26 on the shell 16 to form the seal between the cap and the rim.

A top view of the cap is shown in FIG. 2 which shows that it has an outer ridge 28 and a pair of smaller concentric ridges 30, 32 which surround the outlet port 34 and the center of the cap which is in alignment with the upper end 36 of the core. A ring gasket 38 is inserted between the ridges 30 and 32 to seal off the space between the cap and the mating receptacle for the tank. The cap is also provided with female threads 40 which secure the tank to a mating pipe or connector in the receptacle. A ring of apertures 42 located on the circumference of the circle 35 surrounds the port 34 and together comprise another port for the filter which is in fluid communication with the space between the shell 16 and the core 18. Screens 44 are secured across the apertures 42 when the adsorbent material is of a size that may otherwise leak out of the filter.

The adsorbent material 14 extends along substantially all of the length of the shell 16 which preferably is at least five times the radius of the shell. For purposes of illustration it will be assumed that the contaminated fluid flows into the filter through the apertures 42 and that the purified fluid flows out of the central outlet port 34, although filtration may be accomplished with the filter of the present invention even if the flow is in the opposite direction. The arrow 46 indicates the fluid entering the filter through the aperture 42 and passing through the adsorbent material 14. The distance between the lines 48 and 50 is the mass transfer zone or MTZ for the intended application. The length of the shell 16 is such that it is approximately three times as long as the MTZ. Therefore, a second zone is formed between the lines 50 and 52 and a third zone is formed between the lines 52 and 54, which are each of a length equal to the MTZ.

The line 48 represents the point at which the fluid has a 95% concentration of the adsorbate at the inlet while the line 50 represents the point at which the fluid has a 5% concentration of the adsorbate at the inlet. When the filter is new as the adsorbate becomes "spent" the 95% line moves down the column to a location such as the line 48' for example while the 5% concentration line moves down to the 50' line. The length of the MTZ between the lines 48' and 50' remains constant, however, Thus, by providing an initial column length of three or more times the length of the MTZ the length of time that the filter may be used without replacement is increased. The core 18 is formed as an elongated cylindrical type which is closed along its length except for its lower end 56 where there is a fluid opening which is preferably formed with a multitude of small apertures 58 that have screens 60 across them to prevent adsorbent 14 from entering the core 18. The apertures 58 preferably extend along approximately only one fourth of the length of the core 18 and are preferably on the order of approximately no more than 70 to 80% of the length of the MTZ.

The fluid after flowing through the adsorbent 14 in the flow path 46 flows through the apertures 58, as indicated by the arrows 61 and then upward along the core as indicated by the arrow 62 until it passes out the port 34 and the cap 19.

A funnel for filling the filter of FIGS. 1 and 2 is shown in FIGS. 3 and 4. The filter 70 is formed with an elongated center member 72 which is of approximately the same size as the core 18. The member 72 may be formed solid or it may use an end plus 74 which has a cap 76 on it that blocks off the top of the pipe if the member 72 is hollow. A truncated funnel section 78 is joined to the central member 72 by the bars 80. The areas 82 between the bars 80 will be spaced outside of the core when the central member 72 is put into the core so that it extends to the bottom of the core when inserted in the core. The purpose of cap 76 is to prevent the material from filling the pipe 18.

During assembly of the filter the core may first be inserted into the open shell and then the central member 72 put into the core 18. The sloping walls 84 will therefore meet the top of the wall 86 extension at the ring line 87. In this manner the core 18 will be properly centered in the shell 16. At this point the bottom of the core 18 may be secured to the bottom 22 of the shell, if desired, by adhesive welding or other suitable means. The filling method of the present invention, however, makes it unnecessary to secure the bottom of the core if the adsorbent material is of a sufficient weight to hold the core in place as the tank is filled. After the tank is filled the wall extension 86 is crimped to the lip 24 to form the rim 26 shown in FIG. 1.

I claim:

1. A freely orientable, readily attachable spin-on gas or liquid filter comprising:
   (a) a tank that comprises an elongated cylindrical shell that has a closed end and an open end;
   (b) a fluid communication means comprising first and second ports located at said open end wherein said first port is circular and is located centrally and said second port is concentric with and surrounds said first port, said second port being formed by a plurality of apertures located along the circumference of a circle that is concentric with said first port;
   (c) an elongated cylindrical core having a length substantially equal to the length of said shell and having first and second ends wherein said first end is adjacent said closed end of said shell and includes a multitude of apertures in communication with the space between said core and said shell and said second end is an alignment with said first port, said core constructed to provide a completely closed fluid channel from its second end to said multitude of apertures in said first end, said cylindrical core centrally supported by material located in said tank;
   (d) a material that removes impurities from a fluid by adsorption in accordance with the mass transfer zone principle, said material filling said tank in the space between said shell and said core from substantially said open end to substantially said closed end of said core, said material operable for filtering impurities in either flow direction, said shell having a length that is at least twice as long as the length of the mass transfer zone of said material for the intended application of said material and said multitude of apertures extends along said first end for a distance that is less than the length of the mass transfer zone; and
   (e) an annular cap that seals off said open end of said shell except for said first and second ports, said circular first port formed in said cap and female threads formed therein so that said filter is readily attachable to an outer pipe, said cap comprising a first and second ridge concentric with said first port wherein said first ridge and said second ridge encircles both said first port and said second port and an annular sealing gasket positioned between said ridges to thereby seal said second port, said annular cap and said cylindrical shell joined together by an annular crimped lip to thereby hold said material in said cylindrical shell.

* * * * *